US009533311B2

(12) United States Patent
Ray et al.

(10) Patent No.: US 9,533,311 B2
(45) Date of Patent: Jan. 3, 2017

(54) APPARATUS AND METHOD FOR REMOVING MERCURY FROM A GAS STREAM

(71) Applicant: EnviroEnergy Solutions, Inc., Brooklyn, NY (US)

(72) Inventors: Isaac Ray, Brooklyn, NY (US); Boris Altshuler, N. Miami Beach, FL (US)

( * ) Notice: Subject to any disclaimer, the term of this patent is extended or adjusted under 35 U.S.C. 154(b) by 694 days.

(21) Appl. No.: 13/929,946

(22) Filed: Jun. 28, 2013

(65) Prior Publication Data

US 2014/0000455 A1 Jan. 2, 2014

Related U.S. Application Data

(60) Provisional application No. 61/690,556, filed on Jun. 29, 2012.

(51) Int. Cl.

| | |
|---|---|
| ***B01D 53/56*** | (2006.01) |
| ***B03C 3/78*** | (2006.01) |
| ***B03C 3/16*** | (2006.01) |
| ***B03C 3/41*** | (2006.01) |
| ***B03C 3/49*** | (2006.01) |

(52) U.S. Cl.

CPC . *B03C 3/78* (2013.01); *B03C 3/16* (2013.01); *B03C 3/41* (2013.01); *B03C 3/49* (2013.01); *B03C 2201/10* (2013.01)

(58) Field of Classification Search

CPC combination set(s) only.
See application file for complete search history.

(56) References Cited

U.S. PATENT DOCUMENTS

| | | | | |
|---|---|---|---|---|
| 7,297,182 B2 * | 11/2007 | Ray | B01D 47/06 | 95/58 |
| 7,459,009 B2 * | 12/2008 | Ray | B03C 3/025 | 55/DIG. 38 |
| 2007/0009411 A1 * | 1/2007 | Ray | B01D 46/0035 | 423/210 |
| 2007/0128090 A1 * | 6/2007 | Ray | B01D 47/06 | 422/186.03 |

* cited by examiner

*Primary Examiner* — Duane Smith
*Assistant Examiner* — Adam W Bergfelder
(74) *Attorney, Agent, or Firm* — Michael J. Brown

(57) ABSTRACT

An apparatus and method for removing mercury from an incoming gas stream contaminated with mercury so as to deliver an outgoing gas stream free of the removed mercury introduces ozone into the gas stream to deposit mercury carried by the gas stream on separator elements so as to remove the deposited mercury from the gas stream. The deposited mercury is washed off of the separator elements, and the removed mercury is collected for further processing.

19 Claims, 2 Drawing Sheets

APPARATUS AND METHOD FOR REMOVING MERCURY FROM A GAS STREAM

FIELD OF INVENTION

The present invention relates generally to the reduction of contaminants emitted into the atmosphere as a result of commercial and industrial processes and pertains, more specifically, to apparatus and method for the removal of mercury from industrial exhausts.

BACKGROUND

The continuing pursuit of more stringent regulations pertaining to the control of contaminants emitted into the ambient atmosphere has led to the requirement for more effective treatment of emissions emanating from commercial and industrial processes.

One of the more difficult to deal with toxic substances encountered in industrial exhausts is mercury. Mercury, in the form of mercury vapor, is prevalent in industrial exhausts, and the removal of mercury from industrial exhausts has received much attention in efforts to attain effective results with economy.

The present invention accomplishes effective removal of mercury from industrial exhausts, with economy, through the utilization of a known physical characteristic of mercury. As reported in page 343 of a text entitled BASICS OF GENERAL CHEMISTRY, by B. V. Nekrasov, published by Chemical Publishing, Moscow, 1969, in the presence of even minute traces of ozone, mercury will tend to lose its liquidity and will be deposited on the wall of the vessel within which it is contained, in the manner of a thin film. The present invention provides method and apparatus which takes advantage of that physical characteristic to accomplish the removal of mercury from industrial exhausts.

SUMMARY OF THE INVENTION

Accordingly, the present invention attains several objects and advantages, some of which are summarized as follows: Removes mercury from industrial exhausts with increased effectiveness, efficiency and economy; enables the effective removal of mercury from industrial exhausts utilizing currently available industrial exhaust treatment apparatus with relatively simple and inexpensive modifications in equipment design and operation; facilitates the safe handling and disposal of mercury removed from industrial exhausts; takes advantage of characteristics of current electrostatic precipitators and, in particular, condensing wet electrostatic precipitators, to accomplish the removal of mercury from industrial exhausts with increased effectiveness, efficiency and economy; allows relatively simple and economical modification of existing facilities for the effective removal of mercury from industrial exhausts, and subsequent safe handling and disposal of the removed mercury; provides a process and an integrated apparatus for the removal of a wide range of particulates and contaminants, including mercury, from contaminated gas streams; provides an integrated apparatus and process for effective and reliable treatment of contaminated gas streams over a relatively long service life.

The above objects and advantages, as well as further objects and advantages, are attained by the present invention which may be described briefly as apparatus for removing mercury from an incoming gas stream contaminated with mercury so as to deliver an outgoing gas stream free of the removed mercury, the apparatus comprising: an inlet for receiving the incoming gas stream and directing the incoming gas stream to a path of travel through the apparatus; an outlet located along the path of travel for delivering the outgoing gas stream; a separator having separator elements located along the path of travel between the inlet and the outlet such that the gas stream is conducted through the separator and to the separator elements; an ozone supplier for introducing ozone into the gas stream to deposit mercury carried by the gas stream on the separator elements so as to remove the deposited mercury from the gas stream; a washer located along the path of travel for washing the deposited mercury from the separator elements, whereby the outgoing gas stream is rendered free of the removed mercury; and a collector for collecting the removed mercury for further disposition.

In addition, the present invention includes a method for removing mercury from an incoming gas stream contaminated with mercury so as to deliver an outgoing gas stream free of the removed mercury, the method comprising: directing the incoming gas stream along a predetermined path of travel extending between an inlet for the incoming gas stream and an outlet for the outgoing gas stream; conducting the gas stream through a separator having separator elements located along the path of travel such that the gas stream is conducted through the separator and to the separator elements; introducing ozone into the gas stream to deposit mercury carried by the gas stream on the separator elements so as to remove the deposited mercury from the gas stream; washing the deposited mercury from the separator elements, whereby the outgoing gas stream is rendered free of the removed mercury; and collecting the removed mercury from the separation elements for further disposition.

BRIEF DESCRIPTION OF THE DRAWINGS

The invention will be understood more fully, while still further objects and advantages will become apparent, in the following detailed description of preferred embodiments of the invention illustrated in the accompanying drawing, in which.

DETAILED DESCRIPTION OF THE PREFERRED EMBODIMENT

Figure 1:
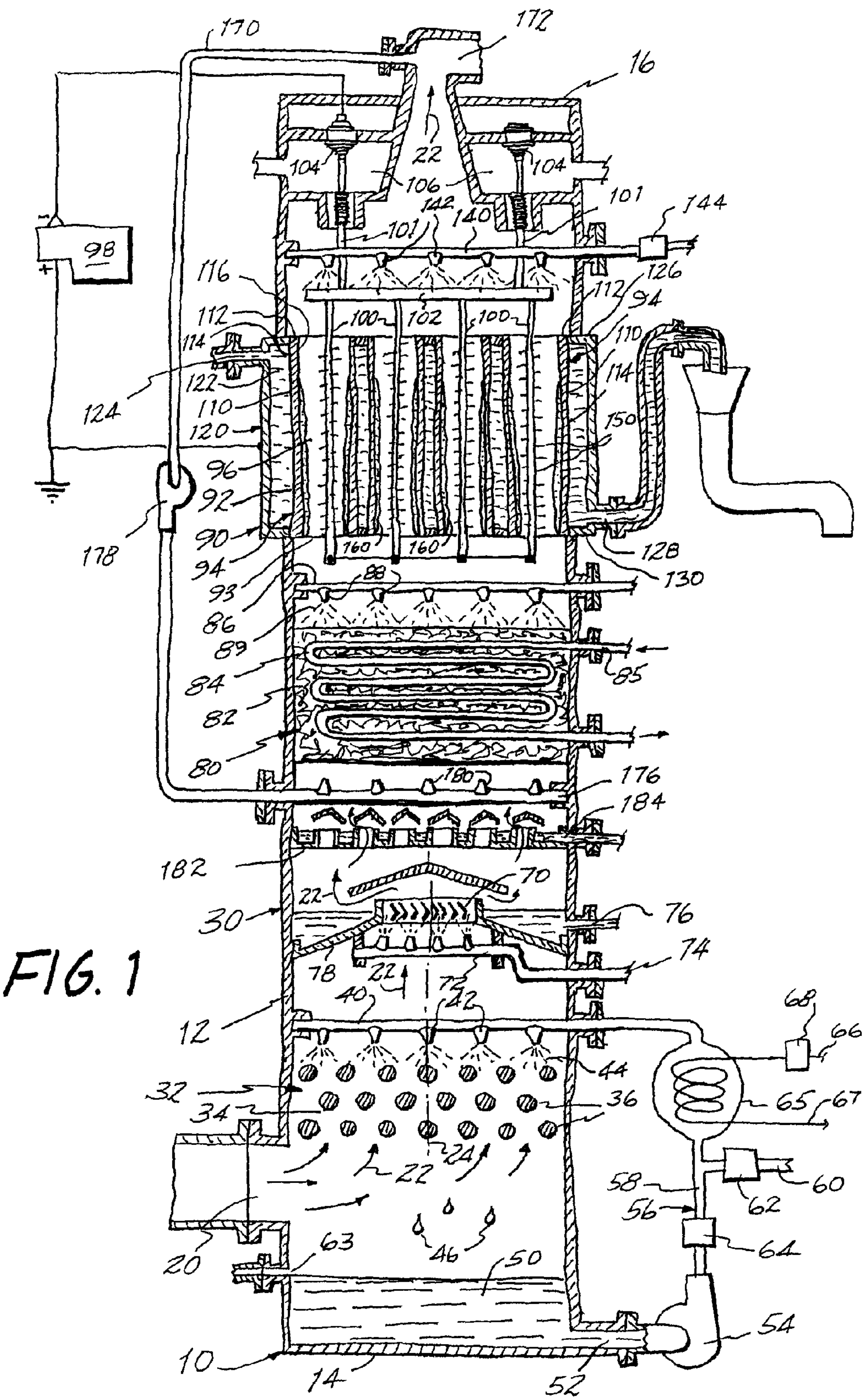
FIG. 1 is a diagrammatic, longitudinal cross-sectional view of an apparatus constructed and operated in accordance with the present invention.

Referring now to the drawings, and especially to FIG. 1 thereof, an apparatus constructed in accordance with the present invention is illustrated generally at 10 and is seen to include a housing 12 which extends vertically from a lower bottom end 14 to an upper top end 16. An inlet is shown in the form of a port 20 located adjacent the bottom end 14 and receives an incoming gas stream, as indicated at 22, laden with contaminants, including particulates, corrosive gases and mercury. The incoming gas stream 22 is directed upwardly along a vertical path of travel 24 into a separator which includes a scrubber section 30, passing first into a first stage scrubber in the form of a liquid distribution scrubber 32 having a scrubbing matrix 34 comprised of separator elements illustrated as a plurality of transverse bars 36.

A moisture supplier in the scrubber section 30 includes a liquid distributor in the form of a spray header 40 having a plurality of spray nozzles 42 located immediately above the matrix 34 for spraying water 44 downwardly into the gas stream 22 as the gas stream 22 travels upwardly along the path of travel 24 through the matrix 34. The turbulence induced by the bars 36 of the matrix 34 accomplishes thorough mixing of the incoming gas stream 22 with the water 44, and larger particulates, in sizes of about two microns and above in diameter, are entrained within water droplets 46 which drop downwardly, by gravity, into a reservoir 50 at the bottom of the housing 12. In addition to the removal of these larger particulates, gas absorption takes place to remove some toxic gases from the gas stream 22. Water 44 is drawn from the reservoir 50, through a passage 52, by a pump 54 which circulates the water to the spray header 40 through a water circuit 56 including a water conduit 58. A bleed line 60 communicates with the water conduit 58 through a bleed control valve 62 to periodically direct portions of water 44 out of the water circuit 56 for removal of the solids collected in the water 44. An overflow drain 63 maintains the water 44 in reservoir 50 at a predetermined level. A control valve 64 controls the flow of water in the water circuit 56, and a heat exchanger 65, which includes an input 66 for a heat exchange medium and an output 67, and a control valve 68 for controlling circulation of the heat exchange medium through the heat exchanger 65, is placed in the water circuit 56 for purposes to be described fully hereinafter.

A demister 70 is located above the scrubbing matrix 34, and a spray header 72 is placed beneath the demister 70 for periodically washing the demister 70 with water supplied at an input 74. A first interstage drain 76 drains wash water accumulated in a first interstage collector shown in the form of first interstage pan 78. Upon leaving the first stage scrubber, the gas stream 22 continues moving upwardly in scrubber section 30 of the separator, passing through the demister 70 and entering a second stage scrubber of the separator, in the form of a packed bed scrubber 80 which includes separator elements in the form of a bed 82 of packing. The packing is preferably a collection of loose materials to provide a large surface area. The larger surface area attracts water by surface tension to provide for greater interaction with the gas stream. A cooler in the form of a cooling coil 84 is embedded in the packing of bed 82 and conducts a cooling medium in the form of cooling water through a conduit 85 established by the cooling coil 84 through the bed 82, for purposes to be described more fully below. A washer includes a first washer element in the form of a spray header 86 having a plurality of spray nozzles 88 located immediately above the packed bed 82 for spraying washing water 89 downwardly into bed 82 of packing, for purposes to be described hereinafter.

The gas stream 22 continues upwardly along path of travel 24 out of the scrubber section 30 and into a wet electrostatic precipitator section 90 of the separator wherein the gas stream 22 passes through a condensing wet electrostatic precipitator 92.

Precipitator 92 includes an inlet area 93 extending transversely across the wet electrostatic precipitator section 90, and a plurality of electrode assemblies 94 arranged in a matrix 96, the matrix 96 extending across the inlet area 93 and the electrode assemblies 94 being powered by a source 98 of high voltage, in a now conventional manner. To that end, the voltage source 98 is connected to discharge electrodes 100 of the electrode assemblies 94 through a support assembly which includes support members 101 and a support frame in the form of a bus frame 102 supported by insulator members in the form of insulators 104 placed in corresponding chambers 106, forming a wet electrostatic precipitator as is known in the art. The bus frame 102 is suspended below the insulators 104 by the support members 101, and the discharge electrodes 100 are suspended downwardly from the bus frame 102 such that each discharge electrode 100 passes through the center of a corresponding collection electrode 110 having a tubular wall 112 connected to the source 98 so that the discharge electrodes 100 carry an electrostatic charge of given polarity and the collection electrodes 110 carry an electrostatic charge having a polarity opposite to the given polarity. In the illustrated embodiment, the discharge electrodes 100 carry a negative charge, while the collection electrodes 110 carry a positive charge.

A coolant jacket 120 surrounds the electrode assemblies 94 and, more specifically, the tubular walls 112 of the collection electrodes 110 surrounding the discharge electrodes 100 in the matrix 96 so as to enable circulation of a coolant 122 around the outside of the tubular walls 112, in contact with the outside surfaces 114 of the tubular walls 112, to maintain the temperature of the tubular walls 112 at a level most conducive to condensation of the moisture carried by the gas stream 22 on the inside surfaces 116 of the tubular walls 112 as the gas stream 22 passes through the interior of the tubular walls 112. Coolant 122 is introduced into the coolant jacket 120 at inlet 124 located adjacent the top end 126 of the coolant jacket 120 and is circulated to outlet 128 adjacent the bottom end 130 of the coolant jacket 120. A second washer element in the form of a spray header 140 having a plurality of spray nozzles 142 is located immediately above the condensing wet electrostatic precipitator 92 and is supplied with wash water through an inlet valve 144, for purposes to be described below. Coolant 122 may be water or another fluid with heat conducting properties.

Incoming gas stream 22 at the inlet port 20 is at an elevated temperature and is contaminated with mercury vapor, as well as with particulates and toxic gases. Larger particulates and toxic gases are removed from the gas stream 22 as the gas stream 22 passes through the scrubber 32 of the separator. At the same time, the gas stream 22 is cooled by water 44 distributed by the spray header 40, preferably to a temperature of about 80° F., before being passed to the packed bed scrubber 80 of the separator. The cooling medium passed through the conduit 85 provided by cooling coil 84 further cools the gas stream 22 so that the temperature of the gas stream 22 as the gas stream 22 is passed to the condensing wet electrostatic precipitator 92 is about 60° F.

Mercury vapor carried in the gas stream 22 will condense at 70° F., the temperature reached within the packed bed 82, and condensed mercury will accumulate within the packing in bed 82. In addition, any mercury droplets entrained in the gas stream 22 emerging from the packed bed 82 will be carried to the precipitator 92.

Within the electrode assemblies 94 of the electrostatic precipitator 92, the discharge electrodes 100 have relatively sharp points 150. As is known in electrostatic precipitators, a strong electrostatic field is generated in each electrode assembly 94, between the discharge electrode 100 and the collection electrode 110, and the sharp points 150 cause corona discharges which, in turn, generate ozone so that, in effect, each electrode assembly 94 serves as an ozone supplier for introducing ozone into the gas stream 22. As the gas stream 22 passes between the discharge electrode 100 and the collection electrode 110 of each electrode assembly 94, mercury droplets carried in the gas stream 22 migrate, together with entrained moisture and other particulates, to the inside surface 116 of the tubular wall 112. The cooled inside surface 116 enables condensation of the moisture from the saturated gas stream 22, establishing a film of condensate 160 on the inside surface 116. At the same time, ozone generated by the corona discharge is absorbed in the condensate 160. The condensate 160, with the entrained mercury and the absorbed ozone, runs down the tubular wall 112 and the mercury thus separated from the gas stream 22 is delivered to the packed bed 82. As indicated above, the mercury, in the presence of the ozone, is deposited, in a thin film of elemental mercury, upon the cooling coil 84 and upon the packing in bed 84. Any mercury which may become separated from the gas stream 22 and deposited upon the inside surface 116 of the tubular wall 112 of an electrode assembly 94 as a result of exposure to ozone in the electrode assembly 94 and which is not carried away by the condensate 160 to the packed bed 84 is washed periodically from the tubular wall 112 by wash water delivered through the spray nozzles 142 of spray header 140.

A duct 170 provides a conduit for conducting a portion of the outgoing gas stream 22 at outlet 172 of the apparatus 10 to a manifold 176 located at an ozone introduction location placed immediately below the packed bed 84. A return blower 178 delivers return gas enriched with ozone to manifold 176 for introduction into the packed bed 82 through distributors 180 in the manifold 176. Exposure of the mercury accumulated in the packed bed 82 to ozone deposits elemental mercury on the cooling coil 84 and the packing of bed 82. The elemental mercury thus separated from the gas stream 22 is then washed from the packed bed scrubber 80 by wash water distributed to the packed bed scrubber 80 through the spray nozzles 88 of the spray header 86 located immediately above the packed bed 82. The wash water with the separated mercury is collected in a second interstage collector, shown in the form of second interstage pan 182 and is drained through a second interstage drain 184 for further disposition. The removed mercury is handled readily for safe disposal.

Figure 2:
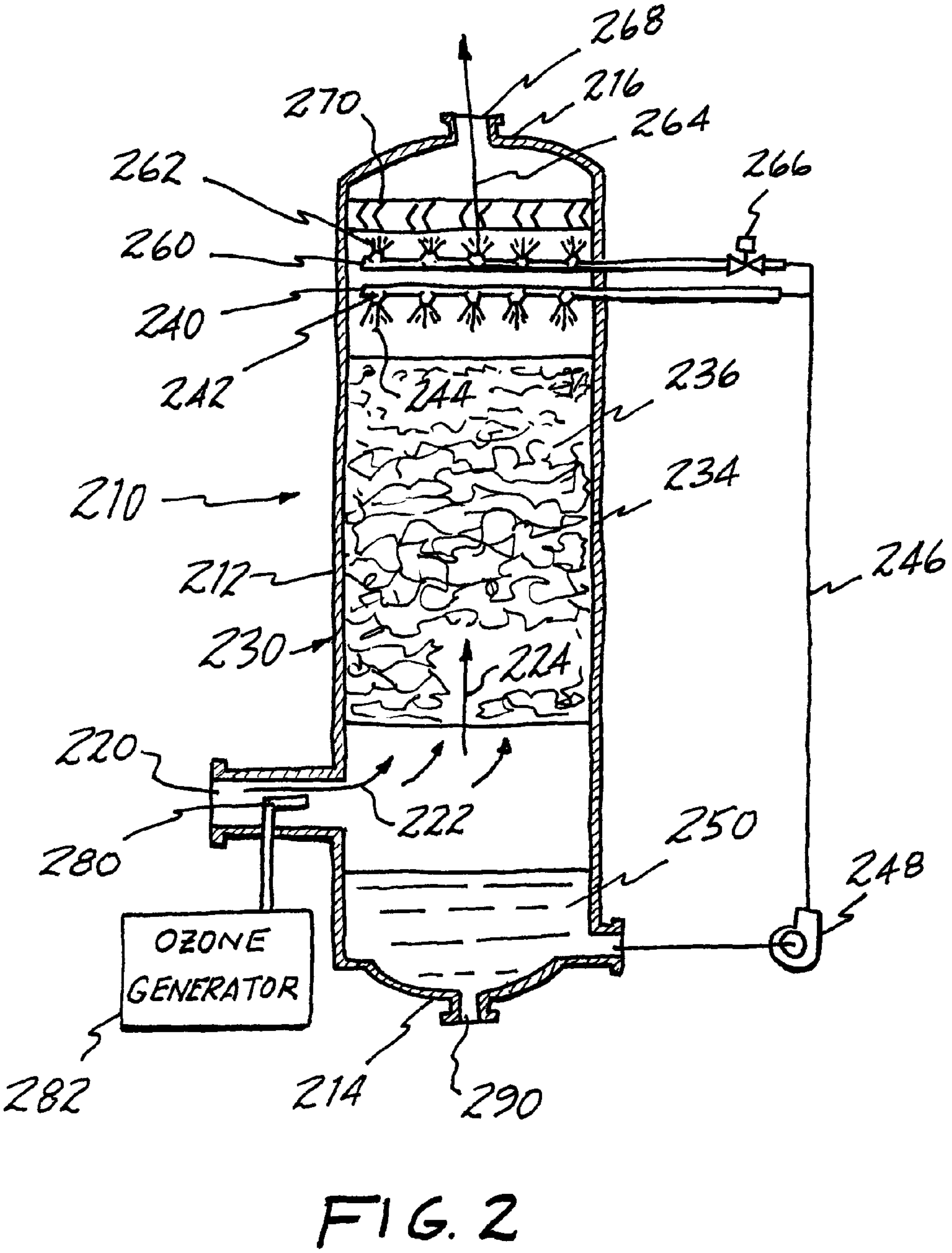
FIG. 2 is a diagrammatic, longitudinal cross-sectional view of another apparatus constructed and operated in accordance with the present invention.

In the embodiments of the invention illustrated in FIG. 2, an apparatus constructed in accordance with the present invention is illustrated generally at 210 and is seen to include a housing 212 which extends vertically from a lower bottom end 214 to an upper top end 216. An inlet is shown in the form of a port 220 located adjacent the bottom end 214 and receives an incoming gas stream, as indicated at 222, laden with contaminants, including mercury. The incoming gas stream 222 is directed upwardly along a vertical path of travel 224 into a separator which includes a scrubber section 230 comprising a packed bed scrubber 234 having separator elements in the form of a bed 236 of packing. A washer includes a washer element in the form of a spray header 240 having a plurality of spray nozzles 242 located immediately above the packed bed 236 for spraying washing water 244 downwardly into bed 236 of packing, for purposes to be described below. Washing water 244 is supplied to spray header 240 by a supply line 246 and a supply pump 248 communicating with a reservoir 250 located adjacent the bottom end 214 of the housing 212. A further spray header 260 is located above the spray header 240 and includes a plurality of spray nozzles 262 for spraying water into outgoing gas stream 264, under the control of a valve 266, as the gas stream 264 moves toward an outlet 268 adjacent the top end 216 of the housing 212. A mist eliminator 270 is placed between the further spray header 260 and the outlet 268.

Incoming gas stream 222 at the inlet port 20 is contaminated with mercury. An ozone injector 280 is placed at the inlet port 20 and is supplied with ozone by an ozone generator 282 so as to introduce ozone into the incoming gas stream 222. As the mercury and ozone laden gas stream 222 passes through the scrubber 234 of the separator, mercury carried in the gas stream 222 will be deposited on the packing in bed 236. The deposited mercury thus separated from the gas stream 222 then is washed from the packed bed scrubber 234 by wash water distributed to the packed bed scrubber 234 through the spray nozzles 242 of the spray header 240 located immediately above the packed bed 236. The wash water with the separated deposited mercury is collected in reservoir 250 and is drained through a drain 290 for further disposition. The removed mercury is handled readily for safe disposal.

It will be seen that the present invention attains the several objects and advantages summarized above, namely: Removes mercury from industrial exhausts with increased effectiveness, efficiency and economy; enables the effective removal of mercury from industrial exhausts utilizing currently available industrial exhaust treatment apparatus with relatively simple and inexpensive modifications in equipment design and operation;

facilitates the safe handling and disposal of mercury removed from industrial exhausts; takes advantage of characteristics of current electrostatic precipitators and, in particular, condensing wet electrostatic precipitators, to accomplish the removal of mercury from industrial exhausts with increased effectiveness, efficiency and economy; allows relatively simple and economical modification of existing facilities for the effective removal of mercury from industrial exhausts, and subsequent safe handling and disposal of the removed mercury; provides a process and an integrated apparatus for the removal of a wide range of particulates and contaminants, including mercury, from contaminated gas streams; provides an integrated apparatus and process for effective and reliable treatment of contaminated gas streams over a relatively long service life.

While certain novel features of the present invention have been shown and described, it will be understood that various omissions, substitutions and changes in the forms and details of the device illustrated and in its operation can be made by those skilled in the art without departing from the spirit of the invention.

We claim:

1. An apparatus for removing mercury from an incoming gas stream contaminated with mercury so as to deliver an outgoing gas stream free of the removed mercury, the apparatus comprising:

an inlet for receiving the incoming gas stream and directing the incoming gas stream to a path of travel through the apparatus;

an outlet located along the path of travel for delivering the outgoing gas stream;

a separator having separator elements located along the path of travel between the inlet and the outlet such that the gas stream is conducted through the separator and to the separator elements;

a cooler for cooling the gas stream conducted through the separator;

an ozone supplier for introducing ozone into the gas stream to deposit mercury carried by the gas stream on the separator elements so as to remove the deposited mercury from the gas stream;

a washer located along the path of travel for washing the deposited mercury from the separator elements, whereby the outgoing gas stream is rendered free of the removed mercury; and a collector for collecting the removed mercury for further disposition.

2. The apparatus of claim 1 wherein the separator comprises an electrostatic precipitator.

3. The apparatus of claim 2 wherein the electrostatic precipitator comprises a condensing wet electrostatic precipitator.

4. The apparatus of claim 1 wherein the ozone supplier comprises an electrostatic precipitator.

5. The apparatus of claim 1 wherein the ozone supplier comprises an ozone introduction location placed between the inlet and the separator elements, and the apparatus further comprises a conduit for conducting a portion of the outgoing gas stream from adjacent to the outlet to the ozone introduction location.

6. The apparatus of claim 1 wherein the separator comprises a scrubber.

7. The apparatus of claim 6 wherein the separator elements comprise packing material located within the scrubber.

8. The apparatus of claim 7 wherein the washer is located between the scrubber and the outlet.

9. An apparatus for removing mercury from an incoming gas stream contaminated with mercury so as to deliver an outgoing gas stream free of the removed mercury, the apparatus comprising:

an inlet for receiving the incoming gas stream and directing the incoming gas stream to a path of travel through the apparatus;

an outlet located along the path of travel for delivering the outgoing gas stream;

an electrostatic precipitator located along the path of travel between the inlet and the outlet;

a scrubber section located along the path of travel between the inlet and the electrostatic precipitator;

separator elements located along the path of travel between the inlet and the outlet;

a cooler for cooling the gas stream conducted through the scrubber section;

an ozone supplier for introducing ozone into the gas stream to induce the deposit of mercury from the gas stream onto the separator elements;

a washer located along the path of travel for washing the deposited mercury from the separator elements; and a collector for collecting the removed mercury for further disposition.

10. The apparatus of claim 9 wherein the path of travel extends vertically upwardly between the inlet and the outlet, and the scrubber section is located vertically below the electrostatic precipitator, aligned vertically with the electrostatic precipitator.

11. The apparatus of claim 10 wherein the washer is located vertically above the electrostatic precipitator.

12. The apparatus of claim 10 wherein the electrostatic precipitator comprises a condensing wet electrostatic precipitator.

13. The apparatus of claim 9 wherein the ozone supplier comprises an ozone introduction location placed between the inlet and the separator elements and a conduit for conducting a portion of the outgoing gas stream from adjacent to the outlet to the ozone introduction location.

14. The apparatus of claim 9 wherein the separator elements comprise packing material located within the scrubber section.

15. The apparatus of claim 14 wherein the washer is located vertically between the electrostatic precipitator and the scrubber section.

16. The apparatus of claim 9 wherein the separator elements comprise packing material located within the scrubber section, and the cooler comprises a cooling conduit extending through the packing material for conducting a cooling medium through the packing material.

17. A method for removing mercury from an incoming gas stream contaminated with mercury so as to deliver an outgoing gas stream free of the removed mercury, the method comprising:

directing the incoming gas stream along a predetermined path of travel extending between an inlet for the incoming gas stream and an outlet for the outgoing gas stream;

conducting the gas stream through a separator having separator elements located along the path of travel such that the gas stream is conducted through the separator and to the separator elements;

cooling the incoming gas stream conducted to the separator elements;

introducing ozone into the gas stream to deposit mercury from the gas stream onto the separator elements;

washing the deposited mercury from the separator elements; and collecting the removed mercury from the separation elements for further disposition.

18. The method of claim 17 wherein the incoming gas stream is cooled to about 70° F.

19. The method of claim 17 wherein the separator comprises an electrostatic precipitator placed between the inlet and the outlet, and the introduction of the ozone comprises conducting a portion of the outgoing gas stream from adjacent to the outlet to an ozone introduction location placed between the inlet and the separator elements.

* * * * *